United States Patent [19]

Roth et al.

[11] Patent Number: 5,175,282

[45] Date of Patent: Dec. 29, 1992

[54] PREPARATION OF COPPER PHTHALOCYANINE PIGMENTS OF THE BETA-MODIFICATION

[75] Inventors: Karl Roth, Limburgerhof; Rudolf Polster, Frankenthal, both of Fed. Rep. of Germany

[73] Assignee: BASF Aktiengesellschaft, Ludwigshafen, Fed. Rep. of Germany

[21] Appl. No.: 803,901

[22] Filed: Dec. 9, 1991

Related U.S. Application Data

[63] Continuation of Ser. No. 538,772, Jun. 15, 1990, abandoned.

[30] Foreign Application Priority Data

Jul. 11, 1989 [DE] Fed. Rep. of Germany ....... 3922734

[51] Int. Cl.$^5$ .............................................. C09B 47/04
[52] U.S. Cl. .................................... 540/141; 540/136; 540/137; 540/140
[58] Field of Search ................ 540/141, 136, 137, 140

[56] References Cited

U.S. PATENT DOCUMENTS 2,556,726  6/1951  Lane ....................................540/141

FOREIGN PATENT DOCUMENTS 0676700 12/1963 Canada ............................... 540/141

*Primary Examiner*—Nicholas S. Rizzo
*Assistant Examiner*—Y. N. Gupta
*Attorney, Agent, or Firm*—Oblon, Spivak, McClelland, Maier & Neustadt

[57] ABSTRACT

Strong, transparent and readily dispersible copper phthalocyanine pigments are obtained by grinding the crude pigment in the presence of from 1 to 10% by weight (based on the crude pigment) of an organic liquid at from 90° to 140° C., the pigment forms obtained giving printing inks with very good flow characteristics.

4 Claims, No Drawings

PREPARATION OF COPPER PHTHALOCYANINE PIGMENTS OF THE BETA-MODIFICATION

This application is a Continuation of application Ser. No. 07/538,772, filed on June 15, 1990, now abandoned.

In general, copper phthalocyanine (CuPu) when first synthesized, is in a coloristically unusable coarsely crystalline form. The surface area of the crude pigment is very small (BET surface area $<6$ m$^2$/g) and the distribution of the particle sizes is highly heterogeneous. For coloristic applications the crude pigment must therefore be converted into a coloristically usable pigmentary state. This can be done for example by treating the crude CuPc with concentrated sulfuric acid and discharging onto water, by grinding the crude CuPc with salt and removing the salt, or by grinding the crude CuPc without salt and recrystallizing the mill base. For ecological reasons the grinding in the absence of salt is preferred. The disadvantage of this grinding method is that it generally produces a high proportion of the α-modification in the mill base, so that the subsequent recrystallization gives rise to acicular pigment particles, which is why such pigments exhibit poor flow characteristics in surface coatings and printing inks.

It is an object of the present invention to provide CuPc pigments which consist essentially of isometric pigment particles.

We have found that this object is achieved by the process of the present invention.

The present invention accordingly provides a process for preparing a strong, transparent and readily dispersible copper phthalocyanine pigment of the β-modification by grinding crude copper phthalocyanine in the absence of any grinding aids and then recrystallizing the mill base in an aqueous organic phase, which comprises grinding the crude pigment in the presence of from 1 to 10% by weight, based on the crude pigment, of an organic liquid at from 90° to 140° C.

The grinding process of the present invention produces a mill base containing only a small proportion of α-modification. The recrystallization gives pigments which consist essentially of isometric particles. The surface coating and printing ink compositions containing these pigments exhibit distinctly improved flow characteristics compared with compositions obtained with pigments based on dry-ground products.

The CuPc pigments obtained with the process of the present invention are highly suitable for pigmenting printing inks, plastics and paints.

The grinding process of the present invention is carried out in ball mills or in grinding apparatus having the same effect, such as attritors.

The amount of organic liquid is from 1 to 10% by weight, based on crude CuPc. Preference is given to using from 2 to 5% by weight. The amount is so small that crude CuPc and the ground product remain pulverulent. In general, the mixture of crude CuPc and organic liquid will be introduced into the mill and then the grinding will be started.

Suitable organic liquids are those having a very high ignition temperature. It is possible to use for example a halobenzene such as dichlorobenzene or trichlorobenzene, nitrobenzene, a $C_1$-$C_4$-alkyl benzoate N-methylpyrrolidone,, ethylene glycol, diethylene glycol, butoxyethanol, phenoxyethanol, ethylene glycol acetate, ethylene glycol diacetate, and mixtures thereof. For ecological reasons preference is given to N-methylpyrrolidine, diethylene glycol, butoxyeth-anol, phenoxyethanol, ethylene glycol acetate, ethylene glycol diacetate and mixtures thereof.

It is also possible to use, for example, di-$C_1$-$C_{12}$-alkyl phthalates.

A particularly preferred organic liquid is phenoxyethanol.

The heat of grinding raises the temperature of the mill contents to 90°-140° C.

Grinding is continued until the mill base consists of agglomerates composed of primary particles from 0.01 to 0.02 μm in size. In general, this state is reached after 12-48 hours.

The mill base is then converted into the pigmentary state by recrystallization from an aqueous organic phase in a conventional manner. The organic part of the aqueous organic phase can be any one of the known partially or completely water-miscible solvents, for example a $C_3$-$C_6$-ketone, a $C_3$-$C_5$-alkanol, tetrahydrofuran or an ethylene glycol mono-$C_3$-$C_5$-alkyl ether. The preferred solvent for the process according to the present invention is n-butoxyethanol.

If the organic solvent used in the aqueous organic phase has a miscibility gap with water, the recrystallization can be controlled in such a way that, at the end of the crystallization, the pigment is obtained in the aqueous organic phase in the form of bead granules. In this case the pigment can be removed from the aqueous organic phase by sieving.

Drying gives a dustless, free-flowing product.

However, the pigment may also be isolated by filtration, if necessary after dilution with water, and be dried in a conventional manner.

The process of the present invention is illustrated in detail by the following Examples:

EXAMPLE 1

(Pigment 1) a) In a 10-m$^3$ ball mill containing 15 t of steel balls (25-28 mm in diameter)

1200 kg of crude copper phthalocyanine, calculated as 100%, and 24 kg of phenoxyethanol are ground at 110° C. for 24 hours.

The mill base obtained comprises agglomerates from 0.5 to 200 μm in size which are composed of primary particles from 0.01 to 0.02 μm in size. After grinding, the mill base is primarily present in the β-modification owing to the effect of the solvent b) 102 parts of the mill base obtained as described in a) are stirred up with 80 parts of filter water and 40 parts of butoxyethanol, and the mixture is then heated to 95°/96° C. and conditioned at that temperature for 8 hours, in the course of which bead granules form as a consequence of the miscibility gap.

Either the granules can be isolated on a sieve (dustless form) or filter water is added to decompose the beads and the pigment is isolated on a filter press. The pigment obtained consists substantially of isometric particles and consequently exhibits very good flow characteristics in printing inks.

COMPARISON 1

Example 1a) was repeated, except that grinding was carried out in the absence of phenoxyethanol The mill base was converted into a pigment form as described under Example 1b).

A printing ink prepared with a pigment content of 16% by weight of pigment 1 gave an efflux time of 22 sec from the DIN cup (4 mm orifice).

By comparison, a printing ink prepared with the same pigment content of Comparison 1 gave an efflux time of >40 sec.

EXAMPLE 2

(Pigment 2) a) In a 10-m$^3$ ball mill containing 13 t of steel balls (diameter 25-28 mm) 1200 kg of crude copper phthalocyanine, calculated as 100%, 60 kg of $H_2SO_4$ and
30 kg of phenoxyethanol are ground at 110° C. for 35 hours.

The mill base obtained consists of agglomerates composed of primary particles from 0.01 to 0.02 μm in size. The mill base is a mixture of α-CuPc and β-CuPc. The proportion of α-CuPc is below 50% by weight.

b) 108 parts of the mill base obtained as described under a) are stirred up with 80 parts of filter water and i 40 parts of butoxyethanol, and the mixture is then heated to 95°/96° C. and conditioned at that temperature for 8 hours, in the course of which bead granules form as a result of the miscibility gap.

The granules can be sieved off and dried, yielding dustless bead granules. It is also possible to work up by adding water to decompose the granules, filter off the pigment on a filter press and dry it.

COMPARISON 2

Example 2a) was repeated, except that the grinding was carried out in the absence of phenoxyethanol. The mill base consists of α-CuPc to an extent of more than 80% by weight.

This mill base was converted into a pigment form as described in Example 2b).

A printing ink prepared with pigment 2 showed distinctly better flow characteristics than a printing ink prepared with Comparison 2 as pigment.

If the grinding of Examples 1 and 2 is carried out not with phenoxyethanol or butoxyethanol but with diethylene glycol, N-methylpyrrolidone, phthalic diesters or ethylene glycol acetates or mixtures thereof, virtually the same products are obtained.

We claim:

1. A process for preparing a strong, transparent and readily dispersible copper phthalocyanine pigment of the β-modification consisting of grinding crude copper phthalocyanine in the absence of any grinding aids in the presence of from 1 to 10% by weight, based on the crude pigment, an organic liquid selected from the group consisting of di-$C_1$-$C_{12}$-alkyl phthalate, N-methylpyrrolidone, diethylene glycol, butoxyethanol, phenoxyethanol, ethylene glycol acetate, ethylene glycol diacetate and mixtures thereof, at from 90° to 140° C., and then recrystallizing the mill base in an aqueous organic phase.

2. A process as claimed in claim 1, wherein the amount of organic liquid is from 2 to 5% by weight, based on crude pigment.

3. A process as claimed in claim 1, wherein the grinding takes place at from 100° to 120° C.

4. A process as claimed in claim 1, wherein the organic liquid used is di-$C_1$-$C_{12}$-alkyl phthalate.

* * * * *